April 19, 1932. V. E. HOFMANN 1,854,471
APPARATUS FOR PRODUCING HOLLOW GLASSWARE
Filed May 15, 1928
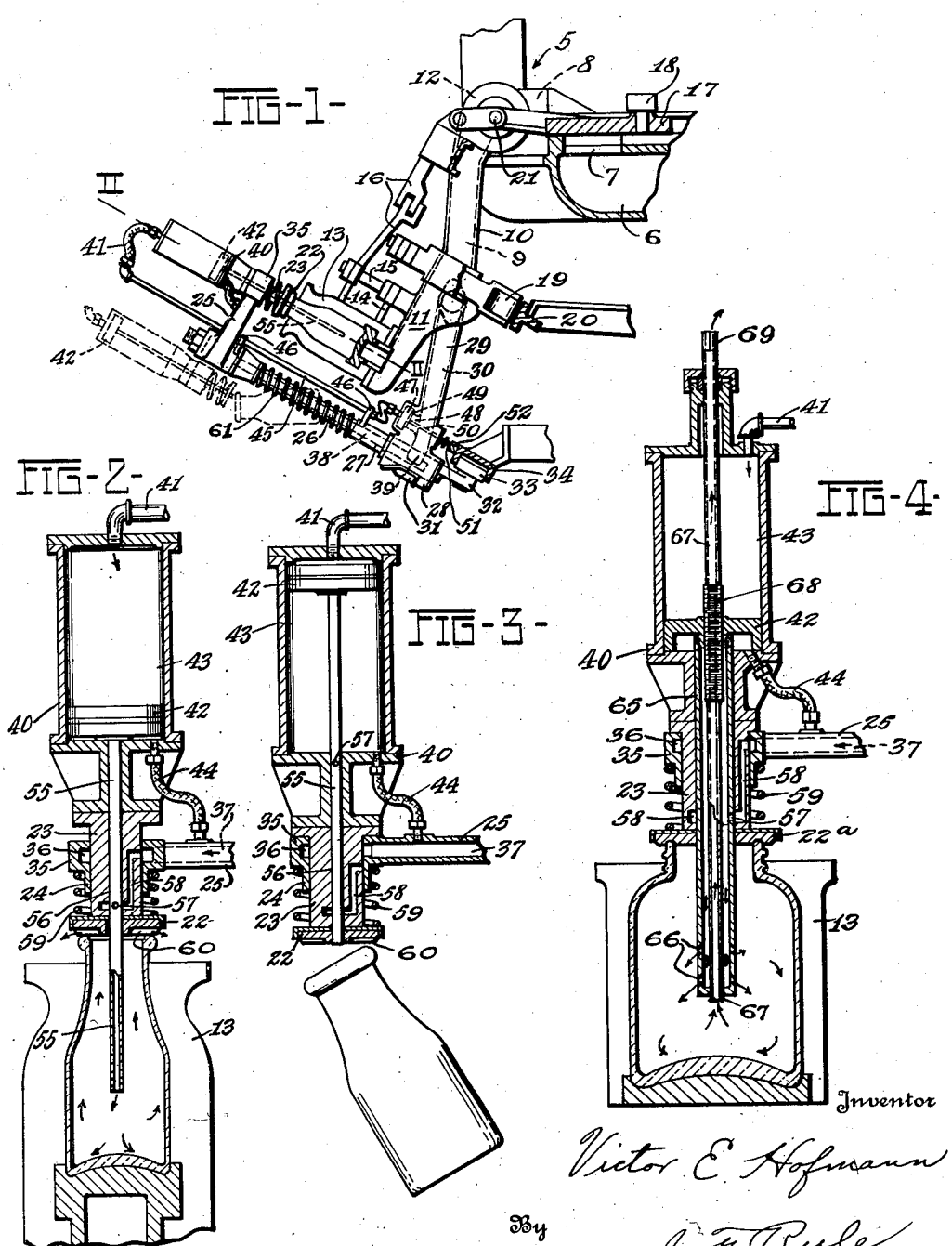

Patented Apr. 19, 1932

1,854,471

UNITED STATES PATENT OFFICE

VICTOR E. HOFMANN, OF TOLEDO, OHIO, ASSIGNOR TO OWENS-ILLINOIS GLASS COMPANY, OF TOLEDO, OHIO, A CORPORATION OF OHIO

APPARATUS FOR PRODUCING HOLLOW GLASSWARE

Application filed May 15, 1928. Serial No. 277,965.

The present invention relates to the production of hollow glass articles such as bottles, jars and the like, which are formed by blowing parisons of plastic glass in molds to the shape of the finished articles, the blown articles being then retained in the molds until they have cooled and hardened sufficiently to retain their shape after the molds are opened. More specifically, the invention relates to a method and apparatus for causing a rapid and even cooling of the articles in the molds in a manner to prevent excessive stresses and strains being set up in the glass. For this purpose, provision is made for causing the circulation of cooling air in contact with the interior surface of the glass in the mold after the article has been blown to its final shape and while it is cooling preliminary to its discharge from the mold.

In accordance with the usual practice in the manufacture of such articles, the cooling of the glass after it is blown to its final form is caused mainly by its contact with the comparatively cold mold which rapidly extracts the heat from the glass. As the mold is in contact with only the exterior surface of the glass, such surface is cooled and hardens much more rapidly than the interior surface, with the result that severe stresses and strains are set up in the glass. It is difficult, if not impossible, to entirely remove these strains during the annealing of the ware, and the process of annealing is rendered much more difficult and requires considerably longer time than would be required with ware in which the introduction of such strains has been avoided.

An object of my invention is to overcome this difficulty by providing suitable means for cooling the interior surface of the ware in the mold at approximately the same rate at which the exterior surface is cooled, thereby preventing such severe strains and stresses being set up in the glass during the cooling operation. For this purpose, there is provided suitable means for circulating a cooling medium such as cold air in contact with the interior surface of the glass in the mold after the final shaping operation, and directing and controlling the application of the cooling air both as to intensity and the portion and extent of the surface to which it is applied. In this manner, the heat may be extracted from the glass through both the interior and exterior surfaces at approximately the same rate, thereby reducing the strains set up and consequently facilitating the annealing operation, and moreover resulting in ware which is entirely or comparatively free from internal strains.

A further object of the invention is to increase the output of the machines in which the articles are formed. The speed at which the machines can operate is often limited by the time required for cooling the articles in the finishing molds. By the provision of means for circulating cooling air within the articles in the molds, in the manner above indicated, said articles are cooled sufficiently to retain their shape, in much less time than is required by the usual operation in which the air in the article is quiescent during the cooling process. The present invention, by providing for a rapid cooling of the article, permits the finishing mold to be opened and the article discharged in a comparatively short time after being blown to its final shape, thus permitting a much more rapid operation of the machine.

A further feature of the invention consists in the provision of means by which the comparatively thick bottoms of the bottles or other blown articles can be rapidly cooled. In the present day methods of making such articles, there is not an entirely even distribution of the glass, but the bottoms of the articles are usually substantially thicker than the side walls thereof. As a result, said bottoms cool comparatively slowly and this unequal rate of cooling of the bottom and side walls also tends to set up internal strains in the glass. The present invention is designed to overcome this difficulty by providing means for concentrating the circulation of cooling air on the interior bottom surface of the article to any extent necessary to cause it to be cooled at the same rate as the side walls. The invention enables the cooling air to be directed against any portions of the interior surface of the article required and its intensity regulated or varied as may be necessary to secure the best results, depending on the shape of the article, shape and thickness of the mold, and other variable factors.

A further object is to provide a device of the character referred to by which the injected cooling air is positively applied to the lower portions and bottom of the ware to obtain uniformity of temperature internally and externally of the entire structure.

Other objects will be apparent hereinafter.

In the accompanying drawings:

Fig. 1 is a fragmentary elevation of a finishing mold and associated mechanism mounted on a mold carriage and embodying the present invention.

Fig. 2 is a detail sectional view illustrating the cooling device operatively associated with a finishing mold and a blown article in the latter, said figure being taken along the line II—II of Fig. 1.

Fig. 3 is a view similar to Fig. 2, showing the injector nozzle retracted to permit ejection of the blown article from the finishing mold.

Fig. 4 is a detail sectional view of another form of the invention.

In the drawings, the finishing mold carriage 5 is provided at its lower end with a chamber 6 to contain low pressure cooling air, said chamber communicating through a port 7 with a passageway 8 leading to a conduit 9 through arms 10 forming a part of the finishing mold frame 11. These passageways 8 and 9 communicate with each other through annular channels 12 (Fig. 1). The finishing mold 13 carried by the frame 11 may be of conventional or any preferred type and has arms 14 fulcrumed to a hinge pin 15 and connected through a series of links 16 to a slide block 17, the latter mounting a cam roll 18 which is intended to run in a stationary cam (not shown). The mold frame 11 carries a roller 19 which runs upon a serpentine track 20 whose shape is such that it swings the finishing mold vertically about the pivot 21 between the horizontal plane and an inclined position, in which latter position ware is ejected from the mold.

A device is provided to engage the upper ends of articles in the finishing mold to hold them against lateral movement with either section of the finishing mold during opening of the latter at the ware ejecting position. This device includes a disk 22 individual to a finishing mold cavity, said disk fixed to the lower end of a rod 23 movable longitudinally in a guide 24, the latter formed on the outer free end of an arm 25.

This arm 25 is carried by a rod 26 whose lower end is telescoped within a sleeve 27, the latter having an enlarged base portion 28 formed at the outer end of a supporting arm 29 (Fig. 1), which has a longitudinal passageway 30 therethrough communicating with the conduit 9 through which low pressure cooling air may flow. The enlarged base portion 28 is formed with an angular slot 31 into which a pin (not shown) carried by the rod 26 projects. This rod 26 may be rotatively connected to an extension 32 carrying a cam roll 33 running in a stationary cam 34. The cam 34 is shaped to periodically move the extension 32 and rod 26 lengthwise and thereby oscillate the rod 26 and move the disk 22 into and out of operative position relative to the finishing mold.

The guide 24 (Figs. 2 and 3) for the rod 23 depends from a chambered head 35, the annular chamber 36 of which extends about the rod 23 and communicates with an air pressure conduit 37 in the arm 25 with which said head is preferably integrally formed. The conduit 37 through the arm 25 is at all times in communication with an axial passageway 38 (Fig. 1) through the rod 26. A radial port 39 at one end of said passageway 38 communicates with the conduit 30 in the supporting arm 29.

The rod 23 (Figs. 2 and 3) carries at its upper end an air motor 40, to the upper end of which air pressure is periodically supplied through a pipe 41. Constant air pressure is applied to the lower side of a piston 42 in the air motor cylinder 43 by way of a flexible pipe 44 leading to the cylinder 43, from the conduit 37 in said arm 25. The periodic application of air pressure to the upper side of the differential piston 42 (Fig. 1) is effected by providing a supply pipe 45 connected to the flexible pipe section 41, said pipe being supported in guides 46 (Fig. 1) and leading to a chamber 47. This chamber 47 communicates through a valved port 48 with the conduit 30, the valve 49 therefor including a stem 50 extending across said conduit and through one wall of the latter.

The outwardly projecting end 51 of the valve stem 50 is adapted to abut a patch 52 on the cam 34 (Fig. 1) when the mold is first lowered, to thereby unseat said valve 49 and apply air pressure to the upper side of the differential piston 42 to move the latter to the position shown in Fig. 2. This differential piston carries an injector tube 55 having an open lower end and projecting downwardly through an axial opening 56 extending through the rod 23 (Fig. 2) and the disk 22. When the finishing mold first assumes the position shown in Fig. 1, the cam patch 52 unseats the valve 49 to thereby admit air pressure into the motor cylinder above the differential piston 42 causing the latter to move downwardly and project the injector tube 55 downwardly a considerable distance into the blown article in the mold.

In order that cooling air or air pressure may be circulated through the blown article, said tube 55 is formed with a radial port 57 (Fig. 2) intermediate its length, the latter adapted to register with a passageway 58 which communicates at times with the chamber 36 extending about the rod 23.

A coil spring 59 encircles the rod 23 and guide 24 between the circular head 35 and disk 22 to normally yieldingly hold the disk and rod in a position wherein the annular chamber 36 and passageway 58 do not communicate with each other.

The disk 22 is formed with a series of radial grooves 60 (Figs. 2 and 3) through which cooling air may be exhausted from the ware in the finishing mold. This construction permits the injection of cooling air and free circulation thereof through the article so that the inner and outer surfaces are substantially uniformly cooled.

After a parison has been placed in the finishing mold 13 and blown to its final form, the finishing mold frame is lowered to the position shown in Fig. 1. At a predetermined station, the cam 34 operates to swing the disk carrying arm 25 to a position in which the disk 22 is seated upon the upper end of the article in the finishing mold. Immediately following this positioning of the disk, the valve stem 51 engages the cam patch 52, and the valve 49 is thereby opened to admit air pressure to the upper side of the differential piston 42 in the air motor 40. The piston 42 moves downwardly, projecting the injector tube 55 a considerable predetermined distance into the article in the finishing mold and simultaneously aligns the port 57 in said tube with the passageway 58 in the rod 23. This passageway 58 has previously been brought into communication with the annular chamber 36 by movement of the disk 22 toward the arm 25 as shown in Fig. 2.

During maintenance of such relative positioning of the elements, cooling air is injected into the article in contact with all portions of the interior of said article and is exhausted through the radial grooves 60 or ports in the disk 22. At a predetermined point in advance of arrival at the ware ejecting station, the cam patch 52 terminates to permit closing of the valve 49 and consequent raising of the differential piston 42 and injector tube 55 as shown in Fig. 3. This is immediately followed by opening of the finishing mold 13 by any suitable mechanism, after which the coil spring 61 encircling the rod 26 expands to move the arm 25 laterally and upwardly away from the article so that the latter may be discharged from the mold.

In another form of the invention (Fig. 4), the disk 22ᵃ which seats upon the article in the finishing mold 13, is formed without grooves or ports, and instead snugly seats upon and closes the upper end of the article. A coil spring 59 is adapted to yieldingly hold the disk 22ᵃ in its lowermost position as in the form just described.

An injector tube 65 is threaded to an extension on the lower side of the piston 42, and extends downwardly through an axial opening in the rod 23, said tube having its lower end closed, and a series of downwardly inclined exhaust ports 66 in its side walls. These ports are preferably arranged at an angle to insure application of cooling air to the lower portions of the articles, as well as the upper portions. An exhaust tube or pipe 67 extends through the injector tube 65 and projects upwardly through the air motor cylinder 43 and outwardly above the upper end of said cylinder.

An intermediate portion on the exhaust tube 67 is formed with screw threads 68 which engage threads in the differential piston 42. The upper end 69 of the tube is shaped for engagement with a suitable instrument by which said tube may be rotated and thereby change its position in said piston and correspondingly vary its extent of projection into an article in the finishing mold 13. By this arrangement, the spacing between the lower end of the exhaust tube 67 and the bottom of the article being cooled may be varied to thereby assist in the control of the application of cooling air to the lower portions of the article. It is evident that by positioning the lower end of the exhaust tube rather close to the bottom of the article, the injected cooling air must necessarily move to the lower portions of the article before it is exhausted to the atmosphere. Thus, the cooling effect of the air on the lower portions of the ware may be regulated.

Glassware produced and subjected to treatment by cooling air as above described is in better condition for annealing than ware produced according to common practice. A more uniform temperature condition throughout the glassware is present when the ware is discharged from the mold and consequently better annealing in the ordinary leer is obtainable.

Modifications may be resorted to within the spirit and scope of the appended claims.

What I claim is:

1. In combination, a mold carriage, a finishing mold frame mounted for vertical swinging movement on the mold carriage, a finishing mold on said frame, a disk, automatic means to seat the disk upon the open upper end of an article enclosed in and protruding above the finishing mold, the disk when seated being spaced above the mold, an injector tube projecting through said disk into said article, means for supplying cooling air through said tube, means to move the tube inwardly to position its inner end in proximity to the bottom of the article in the mold, means for withdrawing the tube from said article, means for opening the mold while the disk remains seated on said article, and means for then withdrawing the disk to release said article.

2. In combination, a mold carriage, a finishing mold frame mounted for vertical swinging movement on the mold carriage, a finishing mold on said frame, a disk, automatic means to seat the disk upon the open upper end of an article enclosed in and protruding above the finishing mold, the disk when seated being spaced above the mold, an injector tube projecting through said disk into said article, means for supplying cooling air through said tube, an air motor operable at regular intervals to project said tube into the article in the finishing mold and to withdraw the tube, means for opening the mold after the tube is withdrawn and while the disk remains seated on said article, and means for then withdrawing the disk to release said article.

3. In combination, a mold in which hollow articles are given their final shape, a disk, means for seating the disk upon the upper end of an article in said mold, a pair of telescopically arranged tubes extending through the disk and projecting into the article in the mold while the disk is seated on said article, said tubes opening into the mold and providing a path of circulation for cooling air within said article, means for injecting cooling air into the article through one tube and exhausting it therefrom to the atmosphere through the other tube, means for withdrawing the tubes, means for opening the mold while the disk remains seated and supports the article, and means for then withdrawing the disk to release the article.

4. In combination, a mold in which hollow articles are given their final shape, a disk, means for seating the disk upon the upper end of an article in said mold, a pair of telescopically arranged tubes extending through the disk and projecting into the article in the mold while the disk is seated on said article, said tubes opening into the mold and providing a path of circulation for cooling air within said article, means for injecting cooling air into the article through one tube and exhausting it therefrom to the atmosphere through the other tube, means for withdrawing the tubes, means for opening the mold while the disk remains seated and supports the article, and means for then withdrawing the disk to release the article, and means to axially adjust the tubes relative to each other to thereby vary the path of movement of the air in the article and thus regulate the intensity of cooling air applied to the lower portions of the article.

5. In a machine for forming hollow glass articles, the combination of a finishing mold in which an article is blown to finished form, said mold open at its upper end, a rock shaft parallel with the axis of the mold, a rock arm thereon, an injector carried by said arm comprising inner and outer tubes, means for projecting the tubes downward into the interior of the article in the mold and for withdrawing the tubes, means for causing circulation of cooling air downward through one tube into said article and exhausting it upward through the other tube, means for withdrawing the mold from said article after said circulation of cooling air therein, and means carried by said rock arm for temporarily supporting the article after the mold is withdrawn.

6. In a machine for forming hollow glass articles, the combination of a finishing mold in which an article is blown to finish form, said mold open at its upper end, a rock shaft parallel with the axis of the mold, a rock arm thereon, an injector carried by said arm comprising inner and outer tubes, means for projecting the tubes downward into the interior of the article in the mold and for withdrawing the tubes, means for causing circulation of cooling air downward through one tube into said article and exhausting it upward through the other tube, said means for projecting and withdrawing the tubes comprising a piston motor, a valve automatically open by the projection of the injector tubes into said article for establishing said circulation of the cooling air, means for withdrawing the mold from said article after said circulation of cooling air therein, and means carried by said rock arm for temporarily supporting the article after the mold is withdrawn.

Signed at Toledo, in the county of Lucas and State of Ohio, this 14th day of May, 1928.

VICTOR E. HOFMANN.